Figure 1:
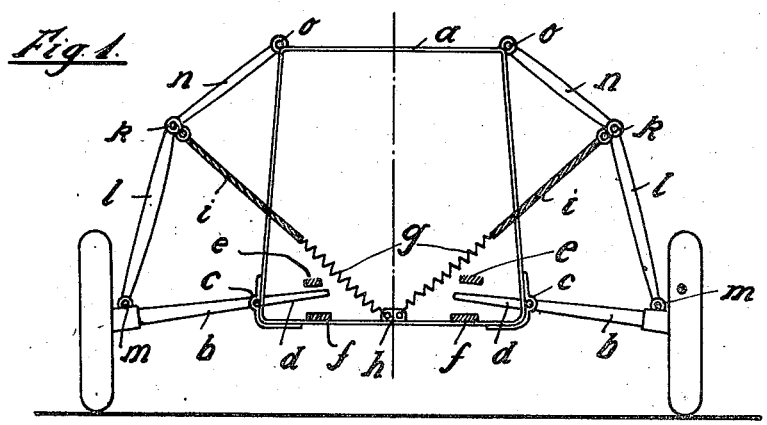

April 26, 1927.

C. DORNIER 1,626,332

LANDING CHASSIS FOR FLYING MACHINES

Filed Aug. 17, 1925

Inventor:
Claudius Dornier
by Kuichaein
Atty.

Patented Apr. 26, 1927.

1,626,332

UNITED STATES PATENT OFFICE.

CLAUDIUS DORNIER, OF FRIEDRICHSHAFEN, GERMANY, ASSIGNOR OF ONE-HALF TO DORNIER-METALLBAUTEN GESELLSCHAFT MIT BESCHRANKTER HAFTUNG, OF FRIEDRICHSHAFEN, GERMANY.

LANDING CHASSIS FOR FLYING MACHINES.

Application filed August 17, 1925, Serial No. 50,875, and in Germany August 30, 1924.

My invention refers to flying machines and more especially to the carriages or landing chassis forming part of such machines. It is an object of my invention to provide a landing chassis in which the wheels or other supports are resiliently suspended in a more favorable manner than was hitherto the case.

In the construction of modern flying machines care is taken as a rule to place the total centre of gravity of the machine as low as possible. In landing chassis of the kind as hitherto designed, streamlined outriggers have been provided which are disposed at or near the bottom edge of the fuselage and to the free ends of which are attached the spring suspension means for the wheel axles, these latter being pivoted to the fuselage within reach of the outriggers. A landing chassis of this kind, although giving full satisfaction in smaller flying machines, if applied to large machines involves the disadvantage that in view of the high bending stresses the outriggers must be made very heavy.

In the landing chassis according to the present invention this drawback is avoided and a number of other advantages are obtained. In this landing chassis the wheels or the like are mounted on axles which are pivoted to the fuselage. Near the wheel bearings a rod is pivoted to the axle, which is linked to another rod pivoted to the fuselage, the two rods extending in the plane of the axle. The common pivot of the two rods is acted upon by a resilient means which is also disposed in this plane and which causes the system of rods and axles to be equipoised.

With a landing chassis of this kind the fuselage can be positioned as low as desired. If it is desired to place it higher than corresponds to a horizontal position of the wheel axles, these latter can be bent upwards or can be supported in structural parts extending downwards from the bottom of the fuselage. The separate axles can also be replaced by a single axle extending across the bottom of the fuselage and in this case the links are replaced by slots in the wall of the fuselage serving as guides for the rods, means being provided for preventing the axle from giving way sideways.

As a resilient means for acting upon the rods I prefer employing springs or a rubber suspension. The resilient suspension acting on the links involves the advantage that, while the resilient force constantly increases from the initial position to the end position, that portion of the wheel pressure which coincides with the direction of the spring action also constantly increases. By suitably selecting the preliminary tension of the resilient means and the angle formed between the two rods, it is possible to obtain a predetermined relation between the increase of the wheel pressure in the direction of the spring and this action itself.

The spring suspension means can be arranged within the fuselage, so as not to offer any resistance to the air. I prefer attaching them to a point disposed in the plane of symmetry of the fuselage. I may, however, also connect the springs or the like to the fuselage in a point adjoining the pivots of the wheel axles.

Inasmuch as the toggle joint formed by the rods is required to extend substantially in the same plane as the wheel axle and the spring suspension, means must be provided for securing this position. I prefer using a pair of upper rods pivoted to two points of the fuselage outside the plane of motion of the lower rod, their outer ends being pivoted to the same point of the lower rod. In order to maintain the wheel axles in the plane of motion of the lower rod, I prefer providing members attached to the fuselage outside of this plane, and which moreover take up the main forces arising on landing, so as to efficiently relieve the wheel axles in this respect.

In order to limit contraction and compression of the springs and steady the support of the machine when at rest, I provide extensions on the wheel axles, the angular displacement of which is limited by suitable checks. The points in which the several parts are connected with the fuselage are preferably positioned all on one of the main panel rods.

In the drawings affixed to this specification and forming part thereof a landing chassis embodying my invention is illustrated diagrammatically by way of example. In the drawings—

Figure 2:
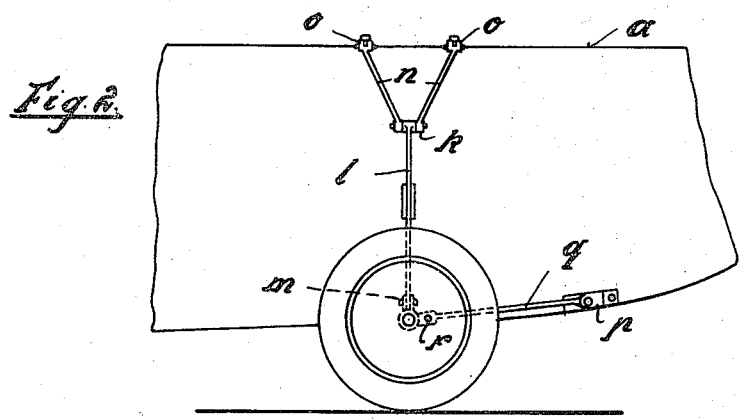
Figure 3:
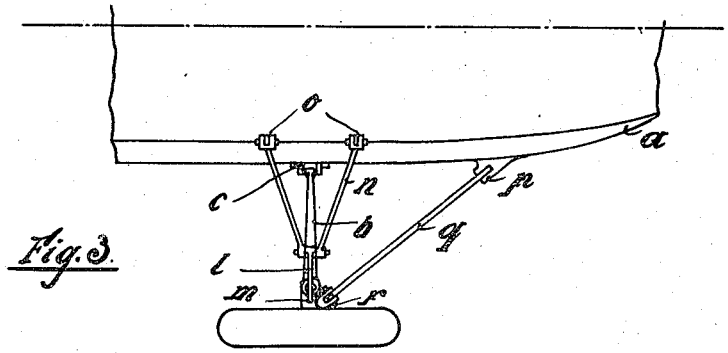

Fig. 1 is a cross-section of the fuselage with the landing chassis shown in end view, Fig. 2 is a side elevation, Fig. 3 is a plan view of one half of the chassis and fuselage.

Referring to the drawings, a is the fuselage and b, b are two wheel axles pivoted to the fuselage at c for vertical rocking motion. The axles b, b carrying the wheels extend inwardly beyond their pivots, the extensions d projecting into the interior of the fuselage and their rocking motion being limited by checks e and f provided for this purpose, the checks e serving for limiting the movement of the axles during flight, while checks f serve for preventing the toggle levers from unduly rocking inwards. The spring suspension means g arranged within the fuselage are attached to a bracket h mounted on the bottom of the fuselage, their free ends being connected with cables i, which exert a pull on the pivots k of the toggle levers l and n, the the levers l being pivoted to the outer ends of the wheel axles at m, while the levers n are pivoted to the points o at the top edge of the fuselage. In order to secure the wheel axles in the plane of motion of the levers l I provide connecting rods q hinged to the fuselage at p and to the wheel hubs at r.

On the wheels touching ground, the wheel axles are forced upwards and are maintained in their plane of motion by the connecting rods q. The pivoting point k of the toggle levers l, n is forced upwardly or outwardly against the action of the springs g. Owing to the favorable action of the toggle levers there arises a distribution of forces which results in a very uniform resilient suspension of the wheel axles throughout their rocking motion, in spite of the steadily increasing braking action of the spring suspension means. The wheel axles are prevented from moving too far by the checks f cooperating with their extensions d.

I wish it to be understood that I do not desire to be limited to the exact details of construction shown and described for obvious modifications will occur to a person skilled in the art.

I claim:—

1. Landing gear for aircraft comprising a fuselage, a wheel arranged on each side of said fuselage for vertical motion relative thereto, a pair of toggle levers inserted between each wheel and said fuselage for movement away from and in a plane substantially at right angles to the longitudinal axis of said fuselage, and resilient means extending between said fuselage and said levers and arranged to counteract such outward movement.

2. Landing gear for aircraft comprising a fuselage, an axle in two parts pivoted to said fuselage, a wheel at the end of each part of said axle, a pair of toggle levers having the outer ends pivoted to the end of each part and to said fuselage respectively, for movement away from and in a plane substantially at right angles to the longitudinal axis of said fuselage and resilient means extending between said fuselage and said levers and arranged to counteract such outward movement.

3. Landing gear for aircraft comprising a fuselage, an axle in two parts pivoted to said fuselage, a wheel at the end of each part of said axle, a pair of toggle levers having the outer ends pivoted to the end of each part and to said fuselage, respectively, for movement away from and in a plane substantially at right angles to the longitudinal axis of said fuselage, resilient means extending between said fuselage and said levers and arranged to counteract such outward movement, and a spacing rod inserted between the end of each part of said axle and a point of said fuselage substantially at the level of said end when at rest.

In testimony whereof I affix my signature.

CLAUDIUS DORNIER.